United States Patent
Diamant et al.

(10) Patent No.: US 7,929,452 B2
(45) Date of Patent: Apr. 19, 2011

(54) INTERNET PROTOCOL (IP) ADDRESS SHARING AND PLATFORM DYNAMIC HOST CONFIGURATION PROTOCOL (DHCP) MEDIATOR

(75) Inventors: Nimrod Diamant, Kfar-Saba (IL); Tsippy Mendelson, Jerusalem (IL); Carey Smith, Hillsboro, OR (US); Avigdor Eldar, Jerusalem (IL); Omer Levy, Jerusalem (IL)

(73) Assignee: Intel Corporation, Santa Clara, CA (US)

( * ) Notice: Subject to any disclaimer, the term of this patent is extended or adjusted under 35 U.S.C. 154(b) by 1344 days.

(21) Appl. No.: 11/173,855

(22) Filed: Jun. 30, 2005

(65) Prior Publication Data

US 2007/0002761 A1    Jan. 4, 2007

(51) Int. Cl.
*H04J 1/16* (2006.01)
(52) U.S. Cl. .................................. 370/252; 709/224
(58) Field of Classification Search .................. 370/235, 370/252, 253; 709/220–227
See application file for complete search history.

(56) References Cited

U.S. PATENT DOCUMENTS

| | | | |
|---|---|---|---|
| 6,782,424 B2 * | 8/2004 | Yodaiken | 709/224 |
| 6,892,229 B1 * | 5/2005 | Karadogan et al. | 709/220 |
| 7,139,818 B1 * | 11/2006 | Kinnear et al. | 709/222 |
| 2004/0054925 A1 * | 3/2004 | Etheridge et al. | 713/201 |
| 2007/0033260 A1 * | 2/2007 | Grouzdev et al. | 709/213 |

\* cited by examiner

*Primary Examiner* — Huy D Vu
*Assistant Examiner* — Dady Chery
(74) *Attorney, Agent, or Firm* — Kacvinsky Daisak PLLC (57) ABSTRACT

Apparatus, system, and method having a first memory to receive a parameter associated with a second operating system protocol stack; and a first operating system protocol stack to be configured with said parameter. The system includes a communication medium and a manageability module. The method includes monitoring content of messages communicated between a host client computer and a server computer over a network, inspecting the content of the messages for protocol parameters, providing the protocol parameters to a manageability module associated with the host client computer, and configuring a second operating system protocol stack associated with the manageability module to match a first operating system protocol stack associated with the host client computer.

24 Claims, 6 Drawing Sheets

INTERNET PROTOCOL (IP) ADDRESS SHARING AND PLATFORM DYNAMIC HOST CONFIGURATION PROTOCOL (DHCP) MEDIATOR

BACKGROUND

In a computer environment where two or more computers are connected in a Local Area Network (LAN) arrangement, the computers may operate in accordance with a Dynamic Host Configuration Protocol (DHCP). A typical computer includes a host computer with an operating system (OS) stack and driver, and a LAN controller to communicate to other computers on the LAN. Communication is controlled by the OS stack and driver. The host computer stack and driver maintain the Internet Protocol (IP) address. Typically the LAN controller is not aware of the IP address, but rather the LAN controller may be aware of and looks for the Medium Access Control (MAC) address. The LAN controller may include an integrated Central Processing Unit (CPU) manageability entity that communicates to the network through the same LAN connection as the host computer. The manageability entity is addressable because it must be accessible from other network computers outside of the host computer. In one setup, if the manageability entity has its own IP address, it must have its own MAC address. In another setup, the manageability entity may use the same MAC address as the host computer where it shares the IP address of the host computer (e.g., in a DHCP environment). In a non-DHCP environment, with the same MAC address, the host computer and the manageability entity each can have its own IP address. In a DHCP enabled environment a network device, such as a LAN controller, may synchronize its usage of IP addresses with that used by a host OS. In other words, the network device may use the same IP address when the host OS is up and running and retain a DHCP address when the host OS is inoperable or malfunctioning. Some network computer applications provide two or more computers that share a LAN interface and are expected to share one IP address. The computers may have to share one IP address network IP address allocation may be limited (e.g., IPv4) and because it is likely that the computers may be accessed using one IP address or using the same network name as though they were a single computer.

In DHCP applications, the two or more computers may work together or separately, so that when one computer is shut down, hanged, or in standby, the other one is still functional and may be accessed over a network. If the IP address is leased from the network using a standard DHCP, then only one of the two or more computers may negotiate for the single IP address and run the protocol against the DHCP server. If the computer goes into shutdown mode, is hanged or becomes standby, then the other computer maintains the lease on behalf of both of them.

When a DHCP server allocates IP addresses based on different DHCP parameter options that are provided by a DHCP client computer, the computers that share the same IP address lease must appear to the DHCP server as a single entity. An example of such system is a Network Interface Chip (NIC) that serves a host OS with an OS driver that includes an embedded manageability computer to operate and communicate to the LAN while the host system is running as well as when the host computer and its OS are in shutdown, hanged or standby mode, or is shutdown. The embedded manageability computer must be accessed regardless of the state of the host OS, so that it can be reached even if the host OS is not capable of extending the DHCP lease.

Conventional network implementations may use different Internet Protocol (IP) addresses such that a host OS has its own IP address while the embedded processor has another address by either having a different Medium Access Control (MAC) address or by using a static IP address. When a dynamic IP address is used in conventional implementations, the embedded manageability computer firmware has its own MAC address and it runs its DHCP client separately (not synchronized) than the one at the host OS. With conventional configurations one machine may consume more than one IP address and host name which makes it harder to deploy in an Enterprise Network (e.g., IPv4).

In a DHCP environment, a network device also must resist Denial of Service (DoS) attacks carried by malicious local software taking advantage of any IP sharing attribute. For example, a rogue DHCP client that continuously releases and acquires a DHCP address. The network device uses hardware (HW) filters maintained in the LAN controller to intercept inbound and outbound DHCP related traffic from and to the host computer. Alternatively, the LAN driver may perform the filtering and notify the network device about various DHCP events in place of the HW filters.

In DHCP applications, network devices may have passive and active modes of operations. For example, when the host is not present (e.g., disconnected) or has no network functionality the network device actively initiates DHCP requests to acquire an IP address from a DHCP server. When the OS is up and running the device tracks the DHCP messages going between the OS and the remote DHCP server to identify the IP address provided to the OS. In addition the device must maintain the state of the DHCP protocol to identify erroneous situations or a DHCP "Release" message sent by the OS after which the device becomes active.

DETAILED DESCRIPTION

Figure 1:
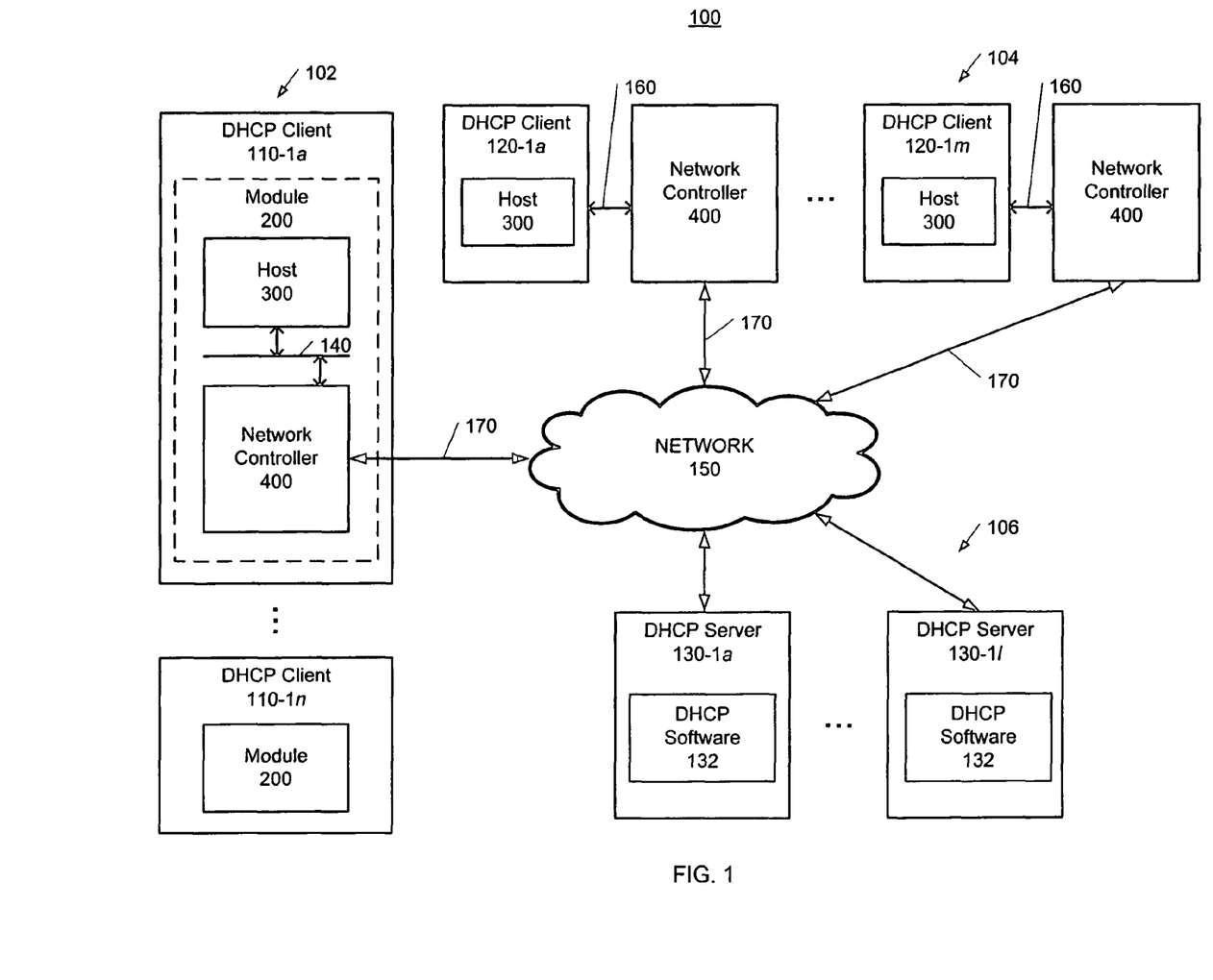
FIG. 1 illustrates one embodiment of a system 100

FIG. 1 illustrates one embodiment of a system 100. FIG. 1 illustrates a block diagram of a system 100. System 100 may comprise a communication system having multiple nodes. A node generally may comprise any physical or logical entity for communicating information in system 100 and may be implemented as hardware, software, or any combination thereof, as desired for a given set of design parameters or performance constraints. Although FIG. 1 may show a limited number of nodes by way of example, it can be appreciated that more or less nodes may be employed for a given implementation. The embodiments are not limited in this context.

A node may comprise any physical or logical entity having a unique address in system 100. The unique address may comprise, for example, a network address such as an IP address, a device address such as a MAC address, and so forth. The embodiments are not limited in this context.

The nodes of system 100 may comprise or form part of a network 150, such as a LAN, a Metropolitan Area Network (MAN), a Wide Area Network (WAN), a Wireless LAN (WLAN), an Internet network, a World Wide Web network, a telephony network (e.g., analog, digital, wired, wireless, Public Switched Telephone Network (PSTN), Integrated Signal Digital Network (ISDN), or Digital Subscriber Line (xDSL)), a radio network, a television network, a cable network, a satellite network, and/or any other wired or wireless communications network configured to carry data. Network 150 may include one or more elements, such as, for example, intermediate nodes, proxy servers, firewalls, routers, switches, hubs, adapters, sockets, and wired or wireless data pathways, configured to direct and/or deliver data to other networks. The embodiments are not limited in this context.

The nodes of system 100 may be arranged to communicate one or more types of information, such as media information and control information. Media information generally may refer to any data representing content meant for a user, such as image information, video information, graphical information, audio information, voice information, textual information, numerical information, alphanumeric symbols, character symbols, and so forth. Control information generally may refer to any data representing commands, instructions or control words meant for an automated system. For example, control information may be used to route media information through a system, or instruct a node to process the media information in a certain manner. The media and control information may be communicated from and to a number of different devices or networks. The embodiments are not limited in this context.

The nodes of system 100 may communicate media and control information in accordance with one or more protocols. A protocol may comprise a set of predefined rules or instructions to control how the nodes communicate information between each other. The protocol may be defined by one or more protocol standards as promulgated by a standards organization, such as the Internet Engineering Task Force (IETF), International Telecommunications Union (ITU), the Institute of Electrical and Electronics Engineers (IEEE), and so forth. For example, system 100 may comprise a packet network communicating information in accordance with one or more packet protocols, such as one or more Internet protocols, such as the Transport Control Protocol (TCP) and IP, TCP/IP, X.25, Hypertext Transfer Protocol (HTTP), User Datagram Protocol (UDP), and DHCP protocol. In another example, system 100 may communicate packets using a medium access control protocol such as Carrier-Sense Multiple Access with Collision Detection (CSMA/CD), as defined by one or more IEEE 802 Ethernet standards. In yet another example, system 100 may communicate packets in accordance with one or more Asynchronous Transfer Mode (ATM) protocols, Frame Relay, Systems Network Architecture (SNA), and so forth. The embodiments are not limited in this context.

In various embodiments, system 100 may be illustrated and described as comprising several separate functional elements, such as modules and/or blocks. Although certain modules and/or blocks may be described by way of example, it can be appreciated that a greater or lesser number of modules and/or blocks may be used and still fall within the scope of the embodiments. Further, although various embodiments may be described in terms of modules and/or blocks to facilitate description, such modules and/or blocks may be implemented by one or more hardware components (e.g., processors, Digital Signal Processors (DSPs), Programmable Logic Devices (PLDs), Application Specific Integrated Circuits (ASICs), circuits, registers), software components (e.g., programs, subroutines, logic) and/or combination thereof. The embodiments are not limited in this context.

In various embodiments, system 100 may comprise multiple modules connected by one or more communications media. Communications media generally may comprise any medium capable of carrying information signals. For example, communications media may comprise wired communications media, wireless communications media, or a combination of both, as desired for a given implementation. Examples of wired communications media may include a wire, cable, printed circuit board (PCB), backplane, semiconductor material, twisted-pair wire, co-axial cable, fiber optics, and so forth. An example of a wireless communications media may include portions of a wireless spectrum, such as the radio-frequency (RF) spectrum. The embodiments are not limited in this context.

The modules may comprise, or may be implemented as, one or more systems, sub-systems, devices, components, circuits, logic, programs, or any combination thereof, as desired for a given set of design or performance constraints. For example, the modules may comprise electronic elements fabricated on a substrate. In various implementations, the electronic elements may be fabricated using silicon-based Integrated Circuit (IC) processes such as complementary metal oxide semiconductor (CMOS), bipolar, and bipolar CMOS (BiCMOS) processes, for example. The embodiments are not limited in this context.

In one embodiment, the modules, sub-modules, components or elements of system 100 may comprise, for example, a network management module to address the growing cost to an Information Technology (IT) organization of computational platform deployment and maintenance. In one embodiment, a network management module may be deployed by embedding a network controller module in hardware associated with a computational platform to communicate with remote management entities by sharing a platform LAN controller with a host computer's OS. In one embodiment, a network management module may comprise its own network stack and manageability service running in parallel and independently of the host computer OS. Because the host computer and network management module may comprise independent network stacks, in one embodiment, each stack may maintain its own network resources, e.g., a dedicated IPv4 address among others, to establish communication with a remote device. These techniques may require any network management module based platforms to double the number of available IPv4 addresses. However, because IPv4 addresses may be limited resource within a corporate network, in one embodiment, a single IP address may be shared between the host OS protocol stack and the network management module protocol stack. Accordingly, networks comprising one or more DHCP servers to automatically provide IPv4 addresses to end DHCP clients may share a single IP address between the two protocol stacks. In one embodiment, a network management module may be implemented in accordance with Intel® Active Management Technology (Intel® AMT), for example. The embodiments are not limited in this context.

Some computer applications may comprise two or more computer systems each comprising a network management module, for example, and a host computer that share a network 150 interface and may share a single IP address. The two or more computer systems may work together so that when one computer is shutdown, hanged, or in standby, the other one is still functional and may be accessed over network 150. If the IP address is leased from network 150 using a standard DHCP, then one of the two or more computer systems may negotiate for a single IP address and run its protocol against the DHCP server. If one computer system goes into shutdown mode, is hanged or becomes standby, then the other computer system is able to maintain the DHCP lease on behalf of both of them. The embodiments are not limited in this context.

In one embodiment, a network management module may comprise a Network Interface Chip (NIC) that serves a host operating system (OS) with its own OS driver that includes an embedded manageability module to operate and communicate to network 150 (e.g., LAN) while the host computer system is operational as well as when the host computer system and its OS are inoperable, disconnected, shutdown, hanged or standby mode, or is shutdown. In one embodiment, an embedded manageability module may be accessed regardless of the state of the host OS, so that it can be reached even if the host OS is incapable of extending the DHCP lease, for reasons discussed above. The embodiments are not limited in this context.

These concepts may be illustrated with reference to FIG. 1, for example. Accordingly, as shown in FIG. 1, system 100 may be realized as network 150 comprising nodes 102, 104, and 106. In various embodiments, nodes 102 and 104 may be arranged to operate as DHCP client computers such as, for example, DHCP clients 110-1*a-n* and 120-1*a-m* (where n and m may be any positive integer), and one or more nodes 106 may be arranged as DHCP servers 130-1*a-l* (where l may be any positive integer), connected via network 150. The embodiments are not limited in this context.

In one embodiment, nodes 102, 104, and 106 may be arranged to operate in accordance with one or more DHCP protocols, as well as MAC protocols, such as from the IEEE 802.3 series of Ethernet protocols, for example. Node 106 may be implemented as a high bandwidth switch, such as a Fast Ethernet switch operating at 100 megabits per second (Mbps), a Gigabit Ethernet switch operating at 1000 Mbps or 10 Gigabits per second (Gbps), a router configured as a DHCP server, and so forth. The embodiments are not limited in this context.

In one embodiment, system 100 may comprise one or more DHCP clients 110-1*a-n* and 120-1*a-m* and one or more DHCP servers 130-1*a-l* and may be connected via network 150. DHCP clients 110-1*a-n* and 120-1*a-m* may comprise a host computer 300 having a host operating system (OS) coupled to a module. In one embodiment, the module coupled to host computer 300 may be a network management module, LAN controller, a Network Interface Chip (NIC), among other network apparatuses, appliances, devices, and the like. In one embodiment, for example, the module coupled to host computer 300 may be a network controller 400 comprising one or more embedded applications, for example. Host computer 300 and network controller 400 may be coupled over bus 140 and may share a single IP address. In one embodiment, network controller 400 may comprise Intel® AMT functionality, for example. In one embodiment, DHCP clients 110-1*a-n* and 120-1*a-m* may communicate with network 150 via connection 170, for example. In one embodiment, host computer 300 and network controller 400 may be provided in a single integrated module 200 or a single computer system, for example. In one embodiment, DHCP servers 130-1*a-l* may comprise, for example, a DHCP software module 132 to provide DHCP functionality. The embodiments are not limited in this context.

In various implementations, module 200 comprising host computer 300 and/or network controller 400 may be arranged to perform various processing operations. Processing operations may generally refer to one or more operations, such as generating, managing, communicating, sending, receiving, storing forwarding, accessing, reading, writing, manipulating, encoding, decoding, compressing, decompressing, encrypting, decrypting, filtering, streaming or other processing of information. The embodiments are not limited in this context.

In one embodiment, system 100 may be arranged such that nodes 102, 104, and 106 may be arranged as any one of DHCP clients 110-1*a-n* and 120-1*a-m* and may be configured to interface 170 to network 150 (e.g. a LAN interface). In one embodiment, any two or more DHCP clients 110-1*a-n* may share a single IP address because of limited allocation of IP addresses in network 150 (e.g., IPv4) or because any two or more DHCP clients 110-1*a-n* and 120-1*a-m* may likely be accessed using a single IP address or using the same name for network 150 as though it was a single system, for example. The embodiments are not limited in this context.

Module 200 associated with any one of DHCP clients 110-1*a-n* may comprise a host computer 300 and network controller 400 that work together so that when a corresponding host 300 in a DHCP client 110-1*a-n* goes into shutdown mode, is hanged or goes into standby mode, the corresponding network controller 400 may be configured and may include functionality such that it may be accessed over network 150, for example. In one embodiment, in any one single DHCP client 110-1*a-n*, host computer 300 and network controller 400 also may work together such that when host computer 300 goes into shutdown mode, is hanged or goes into standby mode, then network controller 400 may still be functional and may be accessed by any one of the available DHCP servers 130-1*a-l* to renew a DHCP lease, for example. In one embodiment, if an IP address for network 150 is leased from any one of the available DHCP servers 130-1*a-l* using a standard DHCP protocol, then only one computer, whether a single DHCP client 110-1*a-n*, or host computer 300 and network controller 400 combination, may negotiate for the single IP address and may run the protocol against any one of the available DHCP server 130-1*a-l*. Thus, if any one of DHCP clients 110-1*a-n* or host computers 300 are somehow disconnected from network 150 or malfunctions in any way (e.g., goes into shutdown mode, is hanged or becomes standby), then its corresponding network controller 400 forming a part of the DHCP client 110-1*a-n*, may maintain the DHCP lease with any one of DHCP servers 130-1*a-i* on behalf of the non-operational host 300 of the particular DHCP client 110-1*a-n*. This situation may occur, for example, when DHCP server 130-1*a-l* allocates IP addresses based on different DHCP parameter options that are provided by a DHCP client 110-1*a-n*. Accordingly, any DHCP client 110-1*a-n* that includes a host computer 300 and network controller 400 that shares a single IP address lease appears to DHCP server 130-1*a-l* as a single entity. For example, the DHCP clients 110-1*a-n* DHCP servers 130-1*a-l* may have the same DHCP parameter options. The embodiments are not limited ion this context.

In one embodiment, for example, network controller 400 may comprise an embedded manageability module comprising an embedded OS and OS driver than is separate from the OS and OS driver of the host computer 300. The OS and OS driver embedded within the manageability module may operate and communicate with network 150 while host computer 300 is running as well as when host computer 300 and the host computer 300 OS go into shutdown mode, are hanged or become standby. Thus, an embedded manageability module may be accessed regardless of the state of host computer 300 or the state of the host computer 300 OS. Therefore, the manageability module may be accessed even if host computer 300 and the host computer OS are incapable of extending a DHCP lease. The embodiments are not limited in this context.

Examples of an OS may comprise, for example, a Cisco Internetwork Operating System (IOS), Juniper JUNOS, Microsoft® Windows® OS (e.g., 95, 98, NT, ME, 2000, XP, CE, Longhorn), Apple Macintosh OS, IBM OS, Linux, Unix, Solaris, 3Com Palm OS, and the like. The embodiments are not limited in this context.

In various embodiments, host computer 300 and network controller 400 may communicate with DHCP servers 130-1a-l in accordance with one or more protocols and/or specifications. For example, in various embodiments, IP addressing sharing may be performed in accordance with DHCP protocol. The embodiments are not limited in this context.

Host computer 300 OS and network controller 400 may comprise embedded applications implemented as firmware, software, hardware or any combination thereof, for example. Network controller 400 may comprise various executable modules such as software, programs, data, drivers, application program interfaces (APIs), and so forth. The firmware may be stored in nonvolatile (NV) memory, such as in bit-masked read-only memory (ROM) or flash memory or disk and more other storage devices. In various implementations, storing the firmware in ROM may preserve flash memory. The NV memory may comprise other types of memory including, for example, programmable ROM (PROM), erasable programmable ROM (EPROM), electrically erasable programmable ROM (EEPROM), or battery backed random-access memory (RAM) such as dynamic RAM (DRAM), Double-Data-Rate DRAM (DDRAM), and/or synchronous DRAM (SDRAM). The embodiments are not limited in this context.

Figure 2:
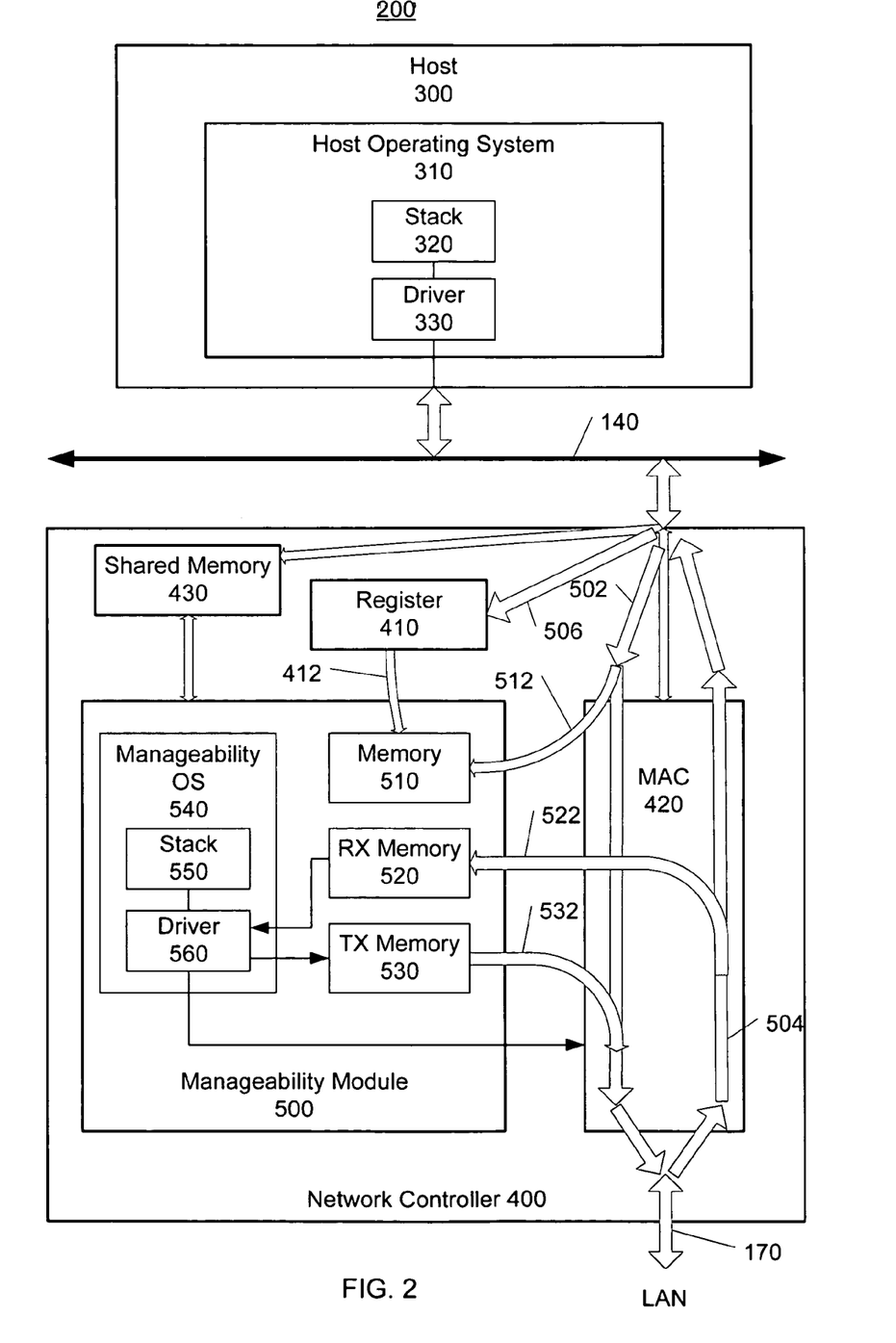
FIG. 2 illustrates one embodiment of a block diagram of module 200.

FIG. 2 illustrates one embodiment of a block diagram of module 200. Module 200 may represent a module of node 102 forming a portion of DHCP clients 110-1a-n, for example, as described with reference to FIG. 1. As shown in FIG. 2, module 200 may comprise host computer 300 coupled to network controller 400 via computer bus 140, for example. In one embodiment, computer bus 140 may be a Peripheral Component Interconnect (PCI) bus, for example. Host computer 300 may comprise host OS 310 comprising a host OS protocol stack 320 and a host network driver 330. Network controller 400 may comprise multiple elements, such as, for example, host interface registers 410 or shared memory 430, Medium Access Controller 420 (MAC), and manageability module 500. In one embodiment, for example, shared memory 430 may provide a way to communicate between host computer 300 and manageability module 500 or MAC 420. In one embodiment, manageability module 500 may comprise a network management module comprising Intel® AMT, for example. In one embodiment, manageability module 500 may comprise multiple elements, such as, for example, memory 510 (e.g., embedded processor memory), receive (RX) memory 520, transmit (TX) memory 530, and manageability operating system 540 comprising a protocol stack 550 and a network driver 560. Some elements may be implemented using, for example, one or more circuits, components, registers, memories, processors, software subroutines, firmware, programmable logic, or any combination thereof. Although FIG. 2 shows a limited number of elements, it can be appreciated that more or less elements may be used in module 200 as desired for any given embodiment. The embodiments are not limited in this context.

In one embodiment, network controller 400 may share an IP address with its host computer 300, for example. In one embodiment, network controller 400 may be self-configured, for example. In one embodiment, network controller 400, may be located in the same computer as host computer 300 in DHCP clients 110-1a-n, as shown in FIG. 1 Although in one embodiment, manageability module 500 may be embedded in network controller 400, for example, in other embodiments manageability module 500 may be located separately from network controller 400 within module 200, for example. In one embodiment, manageability module 500 may be located within a DHCP Client 110-1a-m but separately from module 200, for example. In one embodiment, manageability module 500 may be configured to be aware of DHCP responses or requests to host computer 300 from DHCP servers 130-1a-l via network 150. In one embodiment, manageability module 500 may be configured to be aware of the state of host computer 300 and the state of host OS 310. For example, manageability module 500 may be configured to be aware of whether host computer 300 and/or host OS 310 is in shutdown mode, is hanged or is in standby mode. The embodiments are not limited in this context.

In general operation, module 200 may operate such that network controller 400 shares the same IP address with host computer 300, such as, for example a DHCP IP address allocated by a DHCP server 130-1a-l, for example. Network controller 400 may comprise, for example, an integrated manageability module 500, for example, to access the network controller's 400 MAC 420 to transmit and receive manageability commands to and from network 150. In one embodiment, manageability module 500 may comprise its own OS 540, protocol stack 550, and network driver 560, for example. In one embodiment, manageability module 500 may be self-configured and may share an IP address with host computer 300. The embodiments are not limited in this context.

In order for the host OS 310 protocol stack 320 and the manageability module OS 540 protocol stack 550 to share one DHCP IP address lease, regardless of the state of host OS 310, manageability module 500 may comprise embedded processing functionality implemented in hardware, software, firmware or any combination thereof, to extend the common IP address lease on its own regardless of the state (e.g., shutdown, hanged or standby) of host computer 300 or host OS 310. DHCP servers 130-1a-i may use different DHCP parameter option fields in IP address allocation algorithms, which are stored at host computer 300. Thus, in order for a manageability module 500 to extend a host OS 310 lease of the IP address when host computer 300 and/or host OS 310 are disconnected from network 150 or may be non-operational for a variety of reasons, manageability module 500 should be aware of DHCP parameter options stored at host OS 310 protocol stack 320. The embodiments are not limited in this context.

Accordingly, during transmission of host TX packets 502 from host computer 300 to a DHCP server 130-1a-l, MAC 420 may be configured to monitor every host TX packet 502 transmitted from host computer 300 and to inspect (e.g., filter) the DHCP traffic. Filtered host TX packet frames 512 containing DHCP information are then provided to memory 510. Accordingly, if a host TX packet 502 comprises a message from a DHCP client 110-1a-n to a DHCP server 130-1a-l (e.g., DHCPDISCOVER, DHCPREQUEST, DHCPRELEASE, DHCPDECLINE, etc.), DHCP filtered host TX packet frames 512 may be copied to memory 510 where it may be accessible to manageability module 500 for processing. The embodiments are not limited in this context.

In one embodiment, host OS 310 protocol stack 320 DHCP parameter options information may be provided to the awareness of manageability module 500 through an Out Of Band (OOB) mechanism, such as, for example, dedicated host registers 410 that forms a messaging path from host network driver 330 to manageability module 500. Host network driver 330 provides OOB TX packets 506 to host interface registers 410. At host interface register 410, OOB TX packets 506 are monitored and inspected (e.g., filtered) to extract DHCP messages in the form of filtered OOB TX packet frames 412 and are copied to memory 510 where their content may be accessible to manageability module 500, for example. In various other embodiments, other OOB channels may be provided such that the host OS 310 of a corresponding DHCP client 110-1a-m is enabled to communicate its parameters to manageability module 500 through a LAN driver or other driver and interfaces so that there is no need for TX packets filtering at the host networking stack 320, at the host LAN driver 330 or at the MAC 420, for example. The embodiments are not limited in this context.

From the other side of network 150, for example during transmission of packets from a DHCP server 130-1a-l to host computer 300 of a DHCP client 110-1a-n, MAC 420 may be configured to monitor DHCP reply messages from a DHCP server 130-1a-l that may be received at network 150 as RX packets 504. These RX packets 504 may comprise DHCP parameter options including information about the IP address offers, like the IP address granted, the lease time granted by any one of DHCP servers 130-1a-l. Manageability module 500 may track these DHCP parameter options using MAC 420 to monitor every RX packet 504 and inspect them for DHCP messages from any one of DHCP servers 130-1a-l (e.g., DHCPOFFER, DHCPACK, DHCPNACK) and copy filtered RX packet frames 522 comprising the desired DHCP messages to a RX memory 520 where it may accessible to manageability module 500 to be processed. As discussed previously with respect to TX, such filtering may be done in other embodiments by host OS driver 330 or stack 320 and may be provided to manageability module 500 through various OOB channels, such as dedicated host registers 410, for example. The embodiments are not limited in this context.

Manageability module 500 may provide mainstream packet transmission packets 532 to network 150 by way of TX memory 530. Such mainstream transmission packets 532 may comprise DHCP messages intended for a DHCP server 130-1a-l when host computer 300 is disconnected or inoperable. The embodiments are not limited in this context.

It can be appreciated that the filtering discussed above, such as DHCP filtering TX packets 502, OOB TX packets 506, and RX packets 504, may be implemented in hardware, software, firmware, and any combination thereof. It also can be appreciated that manageability module 500 may be flooded with all host TX packets 502 and OOB TX packets 506 intended for a DHCP server 130-1a-l, and RX packets 504 intended for host computer 300 without filtering. The embodiments are not limited in this context.

Figure 3:
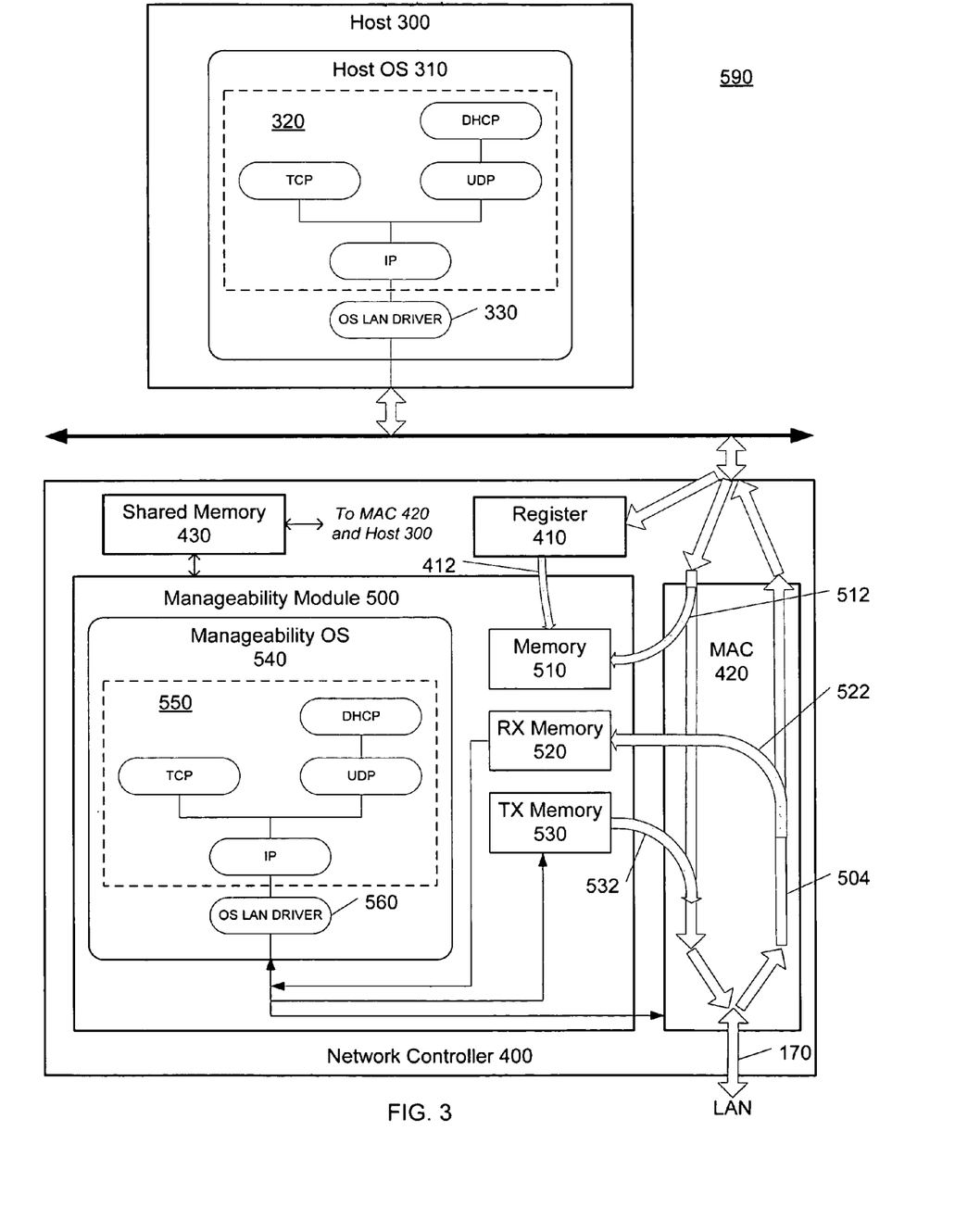
FIG. 3 illustrates one embodiment of a system 590.

FIG. 3 illustrates one embodiment of a system 590. System 590 may comprise host computer 300 coupled to network controller 400. As shown in FIG. 3, host computer 300 may comprise host OS 310, host protocol stack 320, and host network driver 330. In one embodiment, host protocol stack 320 may comprise IP, TCP, UDP, and DHCP protocols, among others, for example. In one embodiment, host network driver 330 may comprise, an OS LAN driver, for example. Network controller 400 may comprise manageability module 500 comprising manageability OS 540. Manageability OS 540 may comprise network protocol stack 550 comprising IP, TCP, UDP, and DHCP protocols, among others, for example. Manageability OS 540 may comprise network driver 560 to access MAC 420 to receive and transmit manageability commands to network 150 via network connection 170, for example. Accordingly, in one embodiment, to allow host OS 310 protocol stack 320 to operate as intended, in one embodiment manageability module 500 may be configure to operate in passive and active modes, for example. The embodiments are not limited in this context.

In passive mode, host OS 310, host protocol stack 320, and host network driver 330 are active and operate in their intended mode. Manageability module 500 configures itself during passive mode by learning DHCP parameter options for host OS 310 being transmitted and received over network 150. In passive mode, manageability module 500 may begin self-configuration by listening to packet transmission traffic through MAC 420 between a corresponding DHCP client 110-1a and any one of the available DHCP servers 130-1a-l. Manageability module 500 copies DHCP parameter options that are required for getting an appropriate IP address lease for later use when it becomes operational on its own (e.g., active mode). The DHCP parameter options are saved in memory 510, or for example, in a non-volatile memory for use at power up. Manageability module 500 also listens to any DHCP messages received from a DHCP server 130-1a-l and copies information included in the messages such as, for example, the leased IP address and lease length of time, and configures its protocol stack 550 according to these values. Also, in passive mode, manageability module 500 does not respond to Address Resolution Protocol (ARP) Pings from an IPv4 device on network 150 and it assumes that host OS 310 is operational to respond to such ARP Pings. In one embodiment, manageability module 500 also may be configured to track the IP address lease timeout to trigger a transition to active mode when it lease timeout expires, if the host OS 310 did not extend the lease. Host OS 310 may not extend the IP address lease because a user at host OS 310 may have changed IP address to a different static IP address, for example. Manageability module 500 also may track host OS 310 DHCP messages (e.g., DHCPRELEASE and DHCPDECLINE) to prevent usage of an invalid host IP address lease. Thus, manageability module 500 is configured and ready to operate in active mode. The embodiments are not limited in this context.

Manageability module 500 goes into active mode when it first powers-up (e.g., when host OS 310 is not operable), or when host OS 310 is shutdown, hanged, or on standby, or when host network driver 330 is removed, for example. In active mode, manageability module 500 behaves as an active DHCP client. Using the recorded DHCP parameter options that it learned from the captured transmissions between a host DHCP client 110-1a and a DHCP server 130-1a-l, for example. Accordingly, manageability module 500 may extend the IP address lease and reply to ARPs and PINGs over network 150, for example. The embodiments are not limited in this context.

Thus, host OS 310 and manageability OS 540 share a single DHCP IP address assigned by one of the available DHCP servers 130-1a-l. Host OS 310 and manageability module OS 540 do not require a different MAC address and do not have to use a static IP address when a dynamic IP address is assigned by any one of the available DHCP servers 130-1a-l, and host DHCP clients 110-1a-n may run concurrently or may be synchronized with their respective network controllers 400 comprising manageability modules 500 running manageability OS 540, for example. Accordingly, with an IP address sharing configuration, a host DHCP client 110-1a may not consume more than one IP address and host name, which makes it easier to deploy in a corporate Enterprise Network (e.g., IPV4). Furthermore, manageability module 500 now may succeed in getting an IP address lease from any one of the available DHCP servers 130-1a-l even if the installed DHCP server accepts clients by special DHCP options, which may not be configured within manageability module 500 (e.g., in the firmware), but may be configured only at host computer 300. Moreover, the embodiments discussed herein may be configured to provide a setup of a DHCP client 110-1a, for example, with DHCP parameter options located only in one place, e.g., at host OS 310, while manageability module 500 runs in the background to learn these DHCP parameter options automatically. The embodiments are not limited in this context.

In a DHCP enabled environment, network controller 400 may synchronize its usage of IP addresses with that used by the host OS 310 and it assure that it uses the same IP address when host OS 310 is up and running and to retain a DHCP address when host OS 310 is inoperable or malfunctioning for various reasons, such as, for example, is shutdown, hanged or on standby. Additionally network controller 400 may be configured to resist Denial of Service (DoS) attacks that may be carried out by malicious local software exploiting the IP address sharing attributes. For example, a rogue DHCP client that continuously releases and acquires a DHCP IP address. Network controller 400 may use filters maintained in MAC 420 and implemented in hardware, software, firmware, or combinations thereof, for example, to intercept inbound and outbound DHCP related message traffic such as host TX packets 502, RX packets 504, and OOB TX packets 506 to and from host computer 300. In one embodiment, the filtering function may be performed at manageability module 500, network driver 560, and/or MAC 420, for example, to filter and notify network controller 400 or manageability module 500 of various DHCP traffic events, for example. The embodiments are not limited in this context.

As previously discussed, in one embodiment, in a DHCP environment, manageability module 500 may operate in either a passive or active mode depending on the state of host computer 300 or host OS 310. For example, when host computer 300 is unavailable, shutdown, hanged, in standby or has no network functionality, manageability module 500 may be configured to actively initiate transmissions of DHCP requests to acquire an IP address from any one of the available DHCP servers 130-1a-l. When host OS 310 is up and running, manageability module 500 may be configured to passively track DHCP message traffic exchanged between host OS 310 and any one of the available remote DHCP servers 130-1a-l to identify the particular IP address assigned to host OS 310. In addition, manageability module 500 may be configured to maintain the state of its DHCP protocol in protocol stack 550 to identify an erroneous situation or a DHCP "Release" message sent by host OS 310 to trigger manageability module 500 into an active mode, for example. The embodiments are not limited in this context.

Accordingly, in one embodiment, manageability module 500 may be configured to act as a DHCP proxy, for example. As a DHCP proxy, in one embodiment, manageability module 500 may be configured as a DHCP client to acquire network 150 addresses from any one of remote DHCP servers 130-1a-l, for example. As a DHCP proxy, in one embodiment, manageability module 500 may be configured to act as a DHCP server for DHCP requests initiated by host OS 310 and present to host computer 300 the address that it previously acquired from any one of DHCP servers 130-1a-l, for example. This DHCP proxy technique may provide additional functionality even in environments where manageability module 500 uses a dedicated IP address that may be different then the one used by host OS 310, for example. For example, manageability module 500 may control DHCP traffic originating from host computer 300 (outbound DHCP traffic) prior to it connecting to network 150. Accordingly, in one embodiment, manageability module 500 may act to enforce certain predetermined policies to assure that any outbound DHCP requests are legitimate and appropriate to protect the infrastructure of network 150. In one embodiment, manageability module 500 may act to enforce certain predetermined policies to protect DHCP servers 130-1a-l from DoS and other known attacks, for example. In one embodiment, for example, manageability module 500 may be configured to prevent or stop a rogue DHCP client from issuing multiple outbound DHCP requests over network 150. For example, manageability module 500 may monitor all such outbound DHCP requests internally and if the number of all such requests exceeds a certain predetermined amount (e.g., based on a predetermined policy), manageability module 500 may abort all such DHCP request, for example. In one embodiment, manageability module 500 also may be configured to prevent or stop a rogue DHCP client from issuing false DHCP requests over network 150 using spoofed MAC addresses as input, for example. In one embodiment, manageability module 500 may be closely coupled to the computational platform, e.g., host computer 300, and accordingly may be pre-configured by an administrator to allow host computer 300 to negotiate specifying as input a single, or in cases of OS virtualization, two or three MAC addresses, for example. The embodiments are not limited in this context.

Operations for the above system and subsystem may be further described with reference to the following figures and accompanying examples. Some of the figures may include programming logic. Although such figures presented herein may include a particular programming logic, it can be appreciated that the programming logic merely provides an example of how the general functionality described herein can be implemented. Further, the given programming logic does not necessarily have to be executed in the order presented unless otherwise indicated. In addition, the given programming logic may be implemented by a hardware element, a software element executed by a processor, or any combination thereof. The embodiments are not limited in this context.

Figure 4:
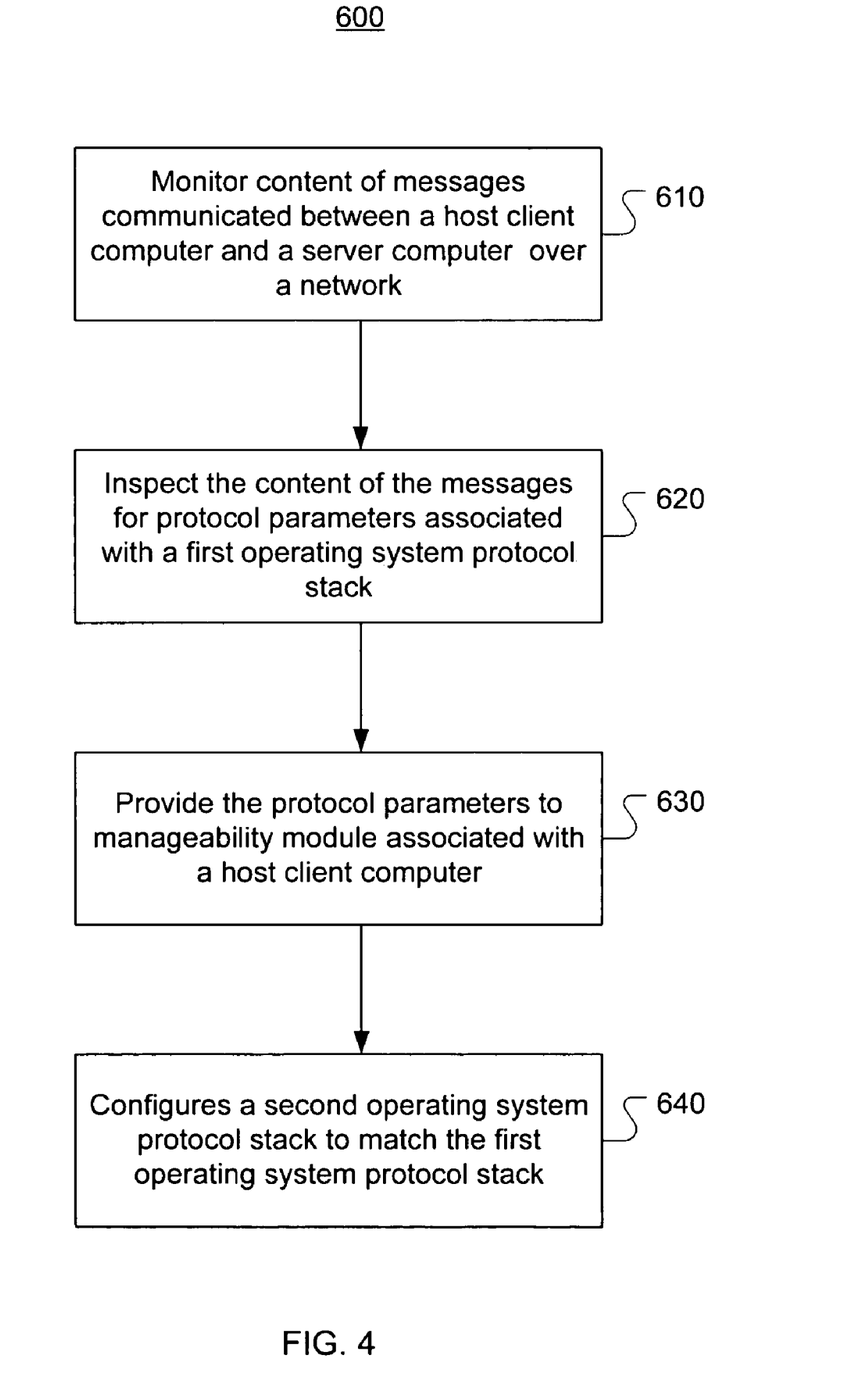
FIG. 4 illustrates one embodiment of a programming logic 600.

FIG. 4 illustrates one embodiment of a programming logic 600. Programming logic 600 may be representative of the operations executed by one or more systems described herein, such as network controller 400 or manageability module 500, for example. Programming logic 600 illustrates a process in which network controller 400 and/or manageability module 500 may process communications between a host client 110-1a-n, 120-1a-m and a server 130-1a-l over network 150. Although programming logic 600 may be executed by a variety of machines, for illustration purposes, programming logic 600 is described with respect to execution by network controller 400 comprising manageability module 500, although the embodiments are not limited in this context. Accordingly, in one embodiment, network controller 400 monitors content of messages communicated between a host client 110-1a and any one of the available servers 130-1a-l over network 150 (610). A host client 110-1a-n may comprise a first operating system protocol stack 320. In one embodiment, network controller 400 inspects the content of the messages for protocol parameters associated with the first operating system protocol stack 320 (620). In one embodiment, network controller 400 provides the protocol parameters to manageability module 500 associated with a host client 110-1a-n (630). Manageability module 500 may comprise a second operating system protocol stack 550. In one embodiment, network controller 400 configures second operating system protocol stack 550 to match the first operating system protocol stack 320 (640).

In addition, In one embodiment, network controller 400 monitors the state of a host client 110-1a-n using manageability module 500 and communicates over network 150 with a server 130-1a-l using manageability module 500 when a host client 110-1a-n becomes inoperable. In one embodiment, network controller 400 inspects the content of the messages for dynamic host configuration protocol (DHCP) network address lease parameters associated with first operating system protocol stack 320. In one embodiment, network controller 400 monitors the state of a host client 110-1a-n using manageability module 500. In one embodiment, network controller 400 communicates over network 150 using the DHCP network IP address lease parameters when the host client 110-1a-n becomes inoperable and may extend a DHCP network address lease. In one embodiment, network controller 400 monitors the content of multiple messages comprising network address requests transmitted from a host client 110-1a-n and aborts the network address requests when the network address requests exceed a predetermined value. In one embodiment, network controller 400 monitors the content of multiple messages for a predetermined parameter transmitted from the host client 110-1a-n and initiates communication with network 150 when the multiple messages comprise the predetermined parameter.

Figure 5:
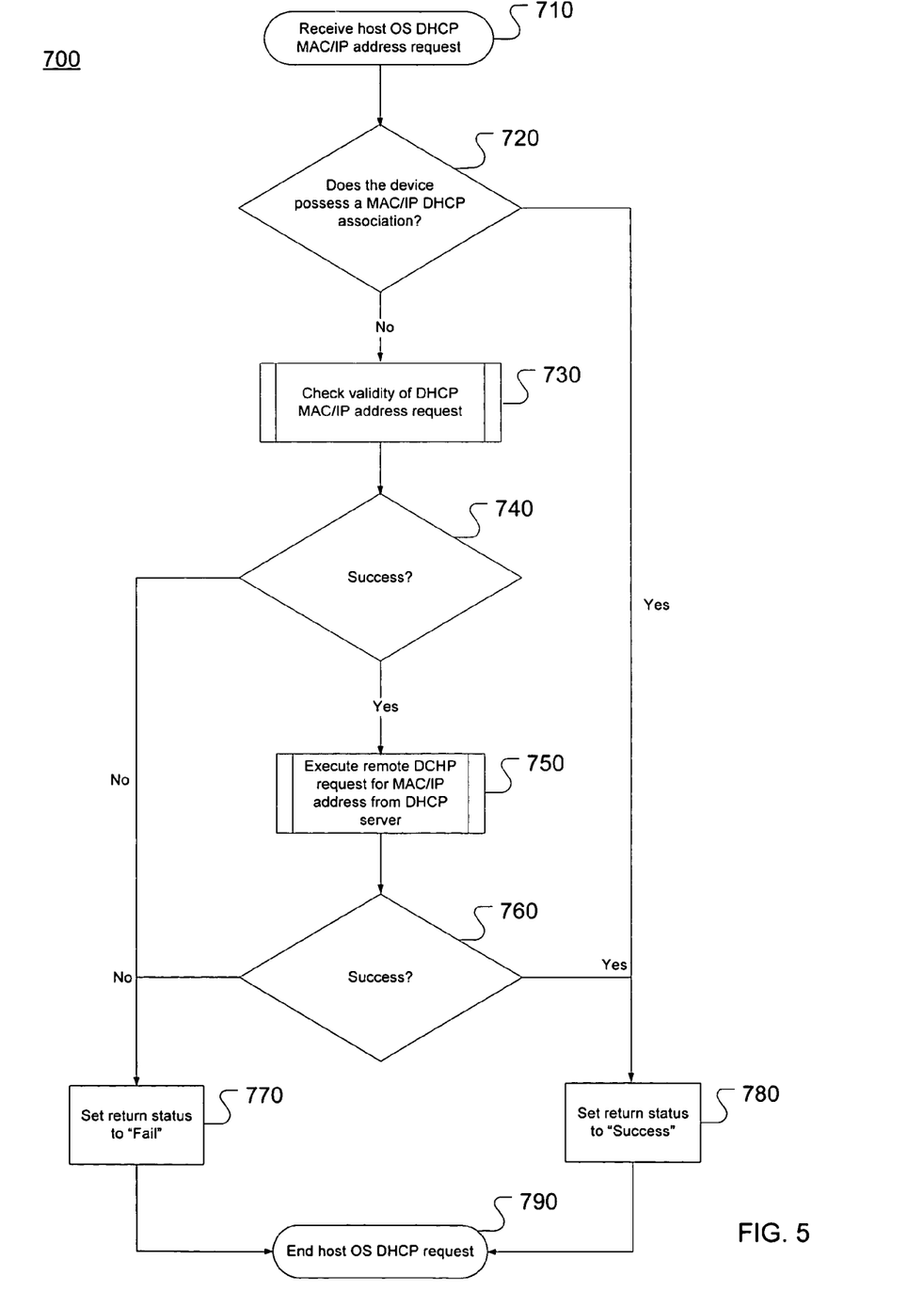
FIG. 5 illustrates one embodiment of a programming logic 700.

FIG. 5 illustrates one embodiment of a programming logic 700. Programming logic 700 may be representative of the operations executed by one or more systems described herein, such as network controller 400 or manageability module 500, for example. Programming logic 700 illustrates a process in which network controller 400 and/or manageability module 500 may process DHCP IP address requests from host computer 300 and/or host OS 310, for example. The embodiments are not limited in this context.

Accordingly, manageability module 500 receives a DHCP MAC/IP address request from host OS 310 (710). Manageability module 500, then decides whether it possesses a MAC/IP DHCP association (720). If manageability module 500 possesses a MAC/IP address association, then the process proceeds along "yes" branch, sets the return status to "success" and the new MAC/IP address to host OS 310 (780) and subsequently ends host OS 310 DHCP request process (790). If manageability module 500 does not possess a MAC/IP address association (720), then the process proceeds along "no" branch to check the validity of the DHCP MAC/IP address request (730). In one embodiment, the validity of the DHCP MAC/IP address request may be performed in accordance with programming logic 730 in FIG. 6, for example. If the validation of the DHCP MAC/IP address request "fails" (740) because host OS 310 has made an invalid MAC/IP address request, the process proceeds along "no" branch, sets return status to "fail" (770), and subsequently ends host OS 310 DHCP request process (790). If the validation of the DHCP MAC/IP address request "succeeds" (740) because host OS 310 has made a valid MAC/IP address request and validation is successful, the process proceeds along "yes" branch to execute a remote DCHP request for a MAC/IP address from a DHCP server 130-1a-l (750). If the remote DHCP request succeeds (760), the process proceeds along "yes" branch, sets return status to "success" and provides the new MAC/IP address to host OS 310 (780). The host OS 310 DHCP request process ends (790). If the remote DHCP request fails (760), the process proceeds along "no" branch and sets return status to "fail" (770). The host OS 310 DHCP request ends (790). The embodiments are not limited in this context.

Figure 6:
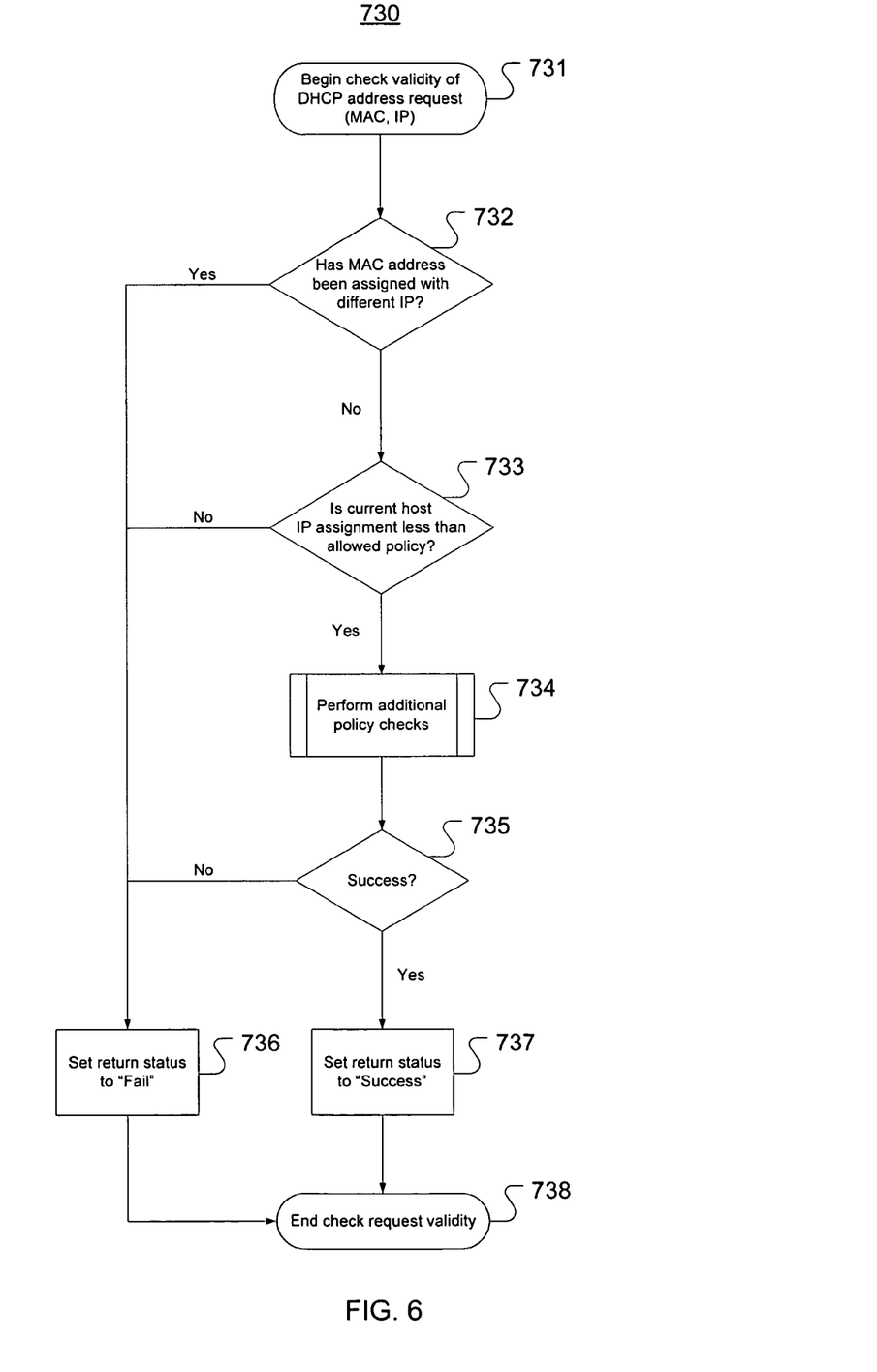
FIG. 6 illustrates one embodiment of a programming logic 730.

FIG. 6 illustrates a programming logic 730. Programming logic 730 may be representative of one embodiment of the operations executed by network controller 400 or manageability module 500 to perform policy verification on host computer 300 DHCP requests, for example. In one embodiment, programming logic 730 may be one example of a process to check the validity of a DHCP address request by host computer 300 (730) in programming logic 700. Accordingly, manageability module 500 begins the process to check the validity of a DHCP address request for a MAC, IP address to ensure that host OS 310 does not request more than a predetermined number of IP addresses (731), for example. Manageability module then determines whether a MAC address has been assigned with a different IP address (732). If a MAC address has been assigned with a different IP address the process proceeds along "yes" branch and sets the return status to "fail" (736) and ends the check DHCP address request validity process (738). If a MAC address has not been assigned with a different IP address (732), process proceeds along "no" branch and determines whether the current host computer 300 IP address assignment is less than a predetermined number of IP address requests allowed by host computer 300 as may be predetermined by a programmed policy (733). If host computer 300 requested more than the predetermined maximum number of IP addresses allowed by policy, then the process proceeds along "no" branch and sets return status to "fail" (736) and ends the check request validity process (738). If host computer 300 requested less than the predetermined maximum number of IP addresses allowed by policy, then the process proceeds along "yes" branch and performs additional policy enforcement functions as may be desired (734). If the additional policy enforcement functions are successful (735), programming logic 730 sets return status to "success" (737), ends check request validity process (738). The process returns to decision block 740 in programming logic 700 (FIG. 5). The embodiments are not limited in this context.

Accordingly, in one embodiment, programming logic 700, 730 provide enforcement of DHCP lease requests at a platform level where the enforcement policy may be better controlled then enforcements performed at a DHCP server or at a network switch. For example, where enforce requests use a MAC address of a LAN controller. Further, the embodiments minimize DoS attacks on a DHCP server and reduce the need to track the state of a DHCP negotiation. The embodiments may be used by an independent platform trusted agent such as Intel® AMT or a management agent located in a trusted partition on a Video Telephony system, for example. The embodiments are not limited in this context.

Numerous specific details have been set forth herein to provide a thorough understanding of the embodiments. It will be understood by those skilled in the art, however, that the embodiments may be practiced without these specific details. In other instances, well-known operations, components and circuits have not been described in detail so as not to obscure the embodiments. It can be appreciated that the specific structural and functional details disclosed herein may be representative and do not necessarily limit the scope of the embodiments.

It is also worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Some embodiments may be implemented using an architecture that may vary in accordance with any number of factors, such as desired computational rate, power levels, heat tolerances, processing cycle budget, input data rates, output data rates, memory resources, data bus speeds and other performance constraints. For example, an embodiment may be implemented using software executed by a general-purpose or special-purpose processor. In another example, an embodiment may be implemented as dedicated hardware, such as a circuit, an application specific integrated circuit (ASIC), Programmable Logic Device (PLD) or digital signal processor (DSP), and so forth. In yet another example, an embodiment may be implemented by any combination of programmed general-purpose computer components and custom hardware components. The embodiments are not limited in this context.

Some embodiments may be described using the expression "coupled" and "connected" along with their derivatives. It should be understood that these terms are not intended as synonyms for each other. For example, some embodiments may be described using the term "connected" to indicate that two or more elements are in direct physical or electrical contact with each other. In another example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

Some embodiments may be implemented, for example, using a machine-readable medium or article which may store an instruction or a set of instructions that, if executed by a machine, may cause the machine to perform a method and/or operations in accordance with the embodiments. Such a machine may include, for example, any suitable processing platform, computing platform, computing device, processing device, computing system, processing system, computer, processor, or the like, and may be implemented using any suitable combination of hardware and/or software. The machine-readable medium or article may include, for example, any suitable type of memory unit, memory device, memory article, memory medium, storage device, storage article, storage medium and/or storage unit, for example, memory, removable or non-removable media, erasable or non-erasable media, writeable or re-writeable media, digital or analog media, hard disk, floppy disk, Compact Disk Read Only Memory (CD-ROM), Compact Disk Recordable (CD-R), Compact Disk Rewriteable (CD-RW), optical disk, magnetic media, various types of Digital Versatile Disk (DVD), a tape, a cassette, or the like. The instructions may include any suitable type of code, such as source code, compiled code, interpreted code, executable code, static code, dynamic code, and the like. The instructions may be implemented using any suitable high-level, low-level, object-oriented, visual, compiled and/or interpreted programming language, such as C, C++, Java, BASIC, Perl, Matlab, Pascal, Visual BASIC, assembly language, machine code, and so forth. The embodiments are not limited in this context.

Unless specifically stated otherwise, it may be appreciated that terms such as "processing," "computing," "calculating," "determining," or the like, refer to the action and/or processes of a computer or computing system, or similar electronic computing device, that manipulates and/or transforms data represented as physical quantities (e.g., electronic) within the computing system's registers and/or memories into other data similarly represented as physical quantities within the computing system's memories, registers or other such information storage, transmission or display devices. The embodiments are not limited in this context.

While certain features of the embodiments have been illustrated as described herein, many modifications, substitutions, changes and equivalents will now occur to those skilled in the art. It is therefore to be understood that the appended claims are intended to cover all such modifications and changes as fall within the true spirit of the embodiments.

The invention claimed is:

1. An apparatus, comprising:
a host computer coupled to a network controller, said network controller including a manageability module comprising a first memory and a first operating system protocol stack, said host computer comprising a second operating system protocol stack, said first memory to receive a parameter including a network address associated with said second operating system protocol stack, said first operating system protocol stack to be configured with said parameter, and said first and second operating system protocol stacks to share said network address; and
a register coupled to said first memory and coupled to a network driver of said host computer, wherein said network driver is to monitor the content of multiple out of band messages transmitted from said host computer, and if at least one of said out of band messages comprises said parameter, said register is to receive said parameter and store said parameter in said first memory.

2. The apparatus of claim 1,
wherein said controller is to monitor the content of multiple messages transmitted from said host computer to a server, and if at least one of said multiple messages comprises said parameter, said controller is to store said parameter in said first memory.

3. The apparatus of claim 1,
wherein said controller is to monitor the content of multiple messages transmitted from a server to said host computer, and if at least one of said multiple messages comprises said parameter, said controller is to store said parameter in said first memory.

4. The apparatus of claim 1,
wherein said controller is to monitor the content of multiple messages comprising network address requests transmitted from said host computer to a server, and when said network address requests exceed a predetermined value, said controller to abort said network address requests.

5. The apparatus of claim 1,
wherein said controller is to monitor the content of multiple messages transmitted from said host computer to a server, and when said multiple messages comprise a predetermined parameter, said controller to initiate communication with a network coupled thereto based on said first operating system protocol stack configured with said parameter.

6. A system, comprising:
a host computer coupled to a network controller, said network controller including a manageability module comprising a first memory and a first operating system protocol stack, said host computer comprising a second operating system protocol stack, said manageability module coupled to a communications medium, said first memory to receive a parameter including a network address associated with said second operating system protocol stack, said first operating system protocol stack to be configured with said parameter, and said first and second operating system protocol stacks to share said network address; and
a register coupled to said first memory and coupled to a network driver of said host computer, wherein said network driver is to monitor the content of multiple out of band messages transmitted from said host computer, and if at least one of said out of band messages comprises said parameter, said register is to receive said parameter and store said parameter in said first memory.

7. The system of claim 6,
wherein said controller is to monitor the content of multiple messages transmitted from said host computer to a server, and if at least one of said multiple messages comprises said parameter, said controller is to store said parameter in said first memory.

8. The system of claim 6,
wherein said controller is to monitor the content of multiple messages transmitted from a server to said host computer, and if at least one of said multiple messages comprises said parameter, said controller is to store said parameter in said first memory.

9. The system of claim 6, wherein said controller is to monitor the content of multiple messages comprising network requests transmitted from said host computer to a server, and when said multiple network address requests exceed a predetermined value, said controller to abort said network address requests.

10. The system of claim 6, wherein said controller is to monitor the content of multiple messages transmitted from said host computer to a server, and when said multiple messages comprise a predetermined parameter, said controller to initiate communication with a network coupled thereto based on said first operating system protocol stack configured with said parameter.

11. A method, comprising:
monitoring content of out of band messages communicated between a host client computer and a server computer over a network, said host client computer comprising a first operating system protocol stack;
inspecting said content of said messages for protocol parameters associated with said first operating system protocol stack, said protocol parameters comprising a network address;
receiving said protocol parameters at a register coupled to a first memory and coupled to a network driver of said host client computer;
providing said protocol parameters to a manageability module associated with said host client computer, said manageability module comprising said first memory and a second operating system protocol stack;
storing said protocol parameters in said first memory;
configuring said second operating system protocol stack to match said first operating system protocol stack and;
sharing said network address between said first and second operating system protocol stacks.

12. The method of claim 11, comprising:
monitoring a state of said host client computer with said manageability module; and
communicating over said network with said server computer with said manageability module when said host client computer becomes inoperable.

13. The method of claim 11, wherein said inspecting comprises inspecting said content of said messages for dynamic host configuration protocol (DHCP) network address lease parameters associated with said first operating system protocol stack.

14. The method of claim 13, comprising:
monitoring a state of said host client computer with said manageability module; and
communicating over said network using said DHCP network address lease parameters when said host client computer becomes inoperable.

15. The method of claim 14, comprising:
extending a DHCP network address lease when said host client computer becomes inoperable.

16. The method of claim 11, comprising:
monitoring content of multiple messages comprising network address request transmitted from said host client computer; and
aborting said network address requests when said network address requests exceed a predetermined value.

17. The method of claim 11, comprising:
monitoring content of multiple messages for a predetermined parameter transmitted from said host client computer; and
initiating communication with said network when said multiple messages comprise said predetermined parameter.

18. The article of claim 17, wherein the stored instructions when executed by a processor are further operable to monitor content of multiple messages comprising network address request transmitted from said host client computer; and abort said network address requests when said network address requests exceed a predetermined value.

19. The article of claim 17, wherein the stored instructions when executed by a processor are further operable to monitor content of multiple messages for a predetermined parameter transmitted from said host client computer; and initiate communication with said network when said multiple messages comprise said predetermined parameter.

20. An article, comprising:
a non-transitory computer-readable storage medium;
said computer-readable storage medium including stored instructions that, when executed by a processor, are operable to monitor content of out of band messages communicated between a host client computer and a server computer over a network, said host client computer comprising a first operating system protocol stack;
inspecting said content of said messages for protocol parameters associated with said first operating system protocol stack, said protocol parameters comprising a network address; inspect said content of said messages for protocol parameters associated with said first operating system protocol stack, said protocol parameters comprising a network address; receive said protocol parameters at a register coupled to a first memory and coupled to a network driver of said host client computer; provide said protocol parameters to a manageability module associated with said host client computer, said manageability module comprising said first memory and a second operating system protocol stack; store said protocol parameters in said first memory; configure said second operating system protocol stack to match said first operating system protocol stack; and share said network address between said first and second operating system protocol stacks.

21. The article of claim 20, wherein the stored instructions when executed by a processor are further operable to monitor a state of said host client computer with said manageability module; and communicate over said network with said server computer with said manageability module when said host client computer becomes inoperable.

22. The article of claim 20, wherein the stored instructions when executed by a processor are further operable to inspect said content of said messages for dynamic host configuration protocol (DHCP) network address lease parameters associated with said first operating system protocol stack.

23. The article of claim 22, wherein the stored instructions when executed by a processor are further operable to monitor a state of said host client computer with said manageability module; and communicate over said network using said DHCP network address lease parameters when said host client computer becomes inoperable.

24. The article of claim 23, wherein the stored instructions when executed by a processor are further operable to extend a DHCP network address lease when said host client computer becomes inoperable.

* * * * *